United States Patent

Simmons

[19]

[11] Patent Number: 5,889,814
[45] Date of Patent: Mar. 30, 1999

[54] TRANSMIT/RECEIVE COMPENSATION FOR A DUAL FDD/TDD ARCHITECTURE

[75] Inventor: William Davis Simmons, Bellevue, Wash.

[73] Assignee: AT&T Wireless Services, Inc., Middletown, N.J.

[21] Appl. No.: 804,614

[22] Filed: Feb. 24, 1997

[51] Int. Cl.⁶ .................................................. H04B 15/00
[52] U.S. Cl. ............................................ 375/200; 370/252
[58] Field of Search ...................... 364/136, 138, 364/140, 148, 151, 481; 370/280, 281, 294, 314, 330, 347, 485, 503, 546; 455/62, 67.3, 67.5, 67.4, 454; 375/200, 208, 228, 346, 347, 349

[56] References Cited

U.S. PATENT DOCUMENTS

| | | |
|---|---|---|
| 3,745,464 | 7/1973 | Lee . |
| 4,979,506 | 12/1990 | Silvian ................................... 375/228 |
| 5,058,102 | 10/1991 | Heidemann ............................ 370/485 |
| 5,084,869 | 1/1992 | Russell . |
| 5,243,598 | 9/1993 | Lee ........................................ 370/95.3 |
| 5,307,341 | 4/1994 | Yates et al. ............................. 370/18 |
| 5,680,394 | 10/1997 | Bingham et al. ...................... 370/294 |

*Primary Examiner*—Stephen Chin
*Assistant Examiner*—Joseph Roundtree

[57] ABSTRACT

Compensation measurements can be made of the transmit and receive path circuitry of a dual FDD/TDD system which can be selectively operated in either the FDD mode or alternately in the TDD mode. BY selectively controlling the switches coupling low frequency and high frequency receivers and coupling low frequency and high frequency transmitters to a diplexer, compensation measurements can be made for both FDD and TDD modes of operation.

2 Claims, 3 Drawing Sheets

TRANSMIT/RECEIVE COMPENSATION FOR A DUAL FDD/TDD ARCHITECTURE

CROSS-REFERENCES TO RELATED APPLICATIONS:

The invention disclosed herein is related to the copending US patent application by Siavash Alamouti, Doug Stolarz, and Joel Becker, entitled "VERTICAL ADAPTIVE ANTENNA ARRAY FOR A DISCRETE MULITTONE SPREAD SPECTRUM COMMUNICATIONS SYSTEM", Ser. No. 08/806,510, filed on the same day as the instant patent application, assigned to AT&T Wireless Services, and incorporated herein by reference.

The invention disclosed herein is related to the copending US patent application by Elliott Hoole, entitled "TRANSMIT / RECEIVE COMPENSATION", Ser. No. 08/806,508, filed on the same day as the instant patent application, assigned to AT&T Wireless Services, and incorporated herein by reference.

BACKGROUND OF THE INVENTION

1. Field of the Invention

The present invention relates to communications systems. More particularly, the present invention relates to wireless discrete multitone spread spectrum communications systems.

2. Description of Related Art

Wireless communications systems, such as cellular and personal communications systems, operate over limited spectral bandwidths and must make highly efficient use of the scarce bandwidth resource for providing quality service to a large population of users.

In the TDD PWAN system described in the copending US patent application by Siavash Alamouti, Doug Stolarz, and Joel Becker, entitled "VERTICAL ADAPTIVE ANTENNA ARRAY FOR A DISCRETE MULTITONE SPREAD SPECTRUM COMMUNICATIONS SYSTEM", Time Division Duplexing (TDD) is used by a base station and a remote unit for transmitting data and control information in both directions over the same multi-tone frequency channel. Transmission from a base station to a remote unit is called "forward transmission" and transmission from a remote unit to a base station is called "reverse transmission". The time between recurrent transmissions from either a remote unit or a base station is called the TDD period. In every TDD period, there are four consecutive transmission bursts in each direction. Data is transmitted during each burst using multiple tones. A base station and each remote unit must synchronize and conform to the TDD timing structure and both a base station and a remote unit must synchronize to a framing structure. All remote units and base stations are globally synchronized so that all remote units transmit at the same time and then all base stations transmit at the same time.

Further, since the TDD PWAN system uses a TDD format, the compensation measurements of the transmit and receive path circuitry are made during the respective idle times of the paths. The time domain duplexing of an airlink results in a 50% duty cycle for utilization of the transmit and receive circuits. Therefore, compensation measurements for the circuitry of a particular path are performed when an airlink does not require its use. Use of the transmit/receive duty cycle of the forward and reverse circuits for making transmit/receive compensation measurements frees system bandwidth and provides much greater measurement flexibility.

In the FDD PWAN system described in the copending US patent application by Alamouti, Michelson, et al., entitled "Method for Frequency Division Duplex Communications", Frequency Division Duplexing (FDD) is used by a base station and a remote unit for transmitting data and control information in both directions over different multi-tone frequency channels. The remote stations and the base station are frequency division duplexed (FDD) by transmitting their respective signals on different sets of discrete frequency tones in two different frequency bands separated by 80 MHZ. The FDD PWAN system needs to make compensation measurements of the transmit and receive path circuitry.

What is needed is a way to perform compensation measurements of the transmit and receive path circuitry of a dual FDD/TDD system which can be selectively operated in either the FDD mode or alternately in the TDD mode.

SUMMARY OF THE INVENTION

Compensation measurements can be made of the transmit and receive path circuitry of a dual FDD/TDD system which can be selectively operated in either the FDD mode or alternately in the TDD mode. By selectively controlling the switches coupling low frequency and high frequency receivers and coupling low frequency and high frequency transmitters to a diplexer, compensation measurements can be made for both FDD and TDD modes of operation.

The invention disclosed herein is a new technique to make the most efficient use of the scarce spectral bandwidth. The invention is a method for updating the transmit and receive compensation weights in a discrete multitone spread spectrum (DMT-SS) communications station, such as a base station. The frequency spectrum of the DMT-SS tones is divided into two portions, an upper frequency band and a lower frequency band. A separate transmit and receive path is used for each band, for each antenna at the base station. In accordance with the inventive method, the first step is receiving in a lower frequency receive path and a higher frequency receive path at the base station during a first time period a first spread signal comprising a first data signal spread over a plurality of discrete tones including a lower tone in the lower frequency path and a higher tone in the higher frequency path., The next step is compensating for drift in the lower frequency receive path and a higher frequency receive path during the first time period by applying receive compensation weights to the first spread signal. The third step is testing a lower frequency transmit path and a higher frequency transmit path at the base station during the first time period and compiling transmit compensation weights. The next step is spreading a second data signal at the base station with a spreading code that distributes the second data signal over a plurality of discrete tones during a second time period. The next step is applying the transmit compensation weights to the second data signal during the second time period. The next step is transmitting the second spread signal over the lower frequency transmit path and the higher frequency transmit path during the second time period. The last step is testing the lower frequency receive path and the higher frequency receive path at the base station during the second time period and compiling new receive compensation weights. In this manner, compensation weights are computed and applied for both the lower frequency paths and the upper frequency paths.

The invention includes a dual frequency division duplex (FDD) mode and time division duplex (TDD) mode. In the FDD mode, the low frequency receiver unit RX1 is set to terminal A of the diplexer and the high frequency transmitter unit TX2 is set to terminal B of the diplexer. In TDD mode two different TDD channels are provided. The first TDD channel uses the low frequency and the switch is reset on every TDD cycle to connect either the transmitter TX1 or the receiver RX1 to the A terminal of the diplexer. The second TDD channel uses the high frequency and the switch is reset on every TDD cycle to connect either the transmitter TX2 or the receiver RX2 to the B terminal of the diplexer. This architecture allows the transmit/receive compensation procedure to be applied to the TDD mode without disabling normal communications. When either TDD channel is in the receive portion of its TDD cycle, then the transmit portion can be tested. Likewise, when either TDD channel is in the transmit portion of its TDD cycle, then the receive portion can be tested.

The invention enables compensation measurements of the transmit and receive path circuitry of a dual FDD/TDD system which can be selectively operated in either the FDD mode or alternately in the TDD mode. By selectively controlling the switches coupling the receivers RX1 and RX2 and the transmitters TX1 and TX2 to the diplexer, compensation measurements can be made for both FDD and TDD modes of operation.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
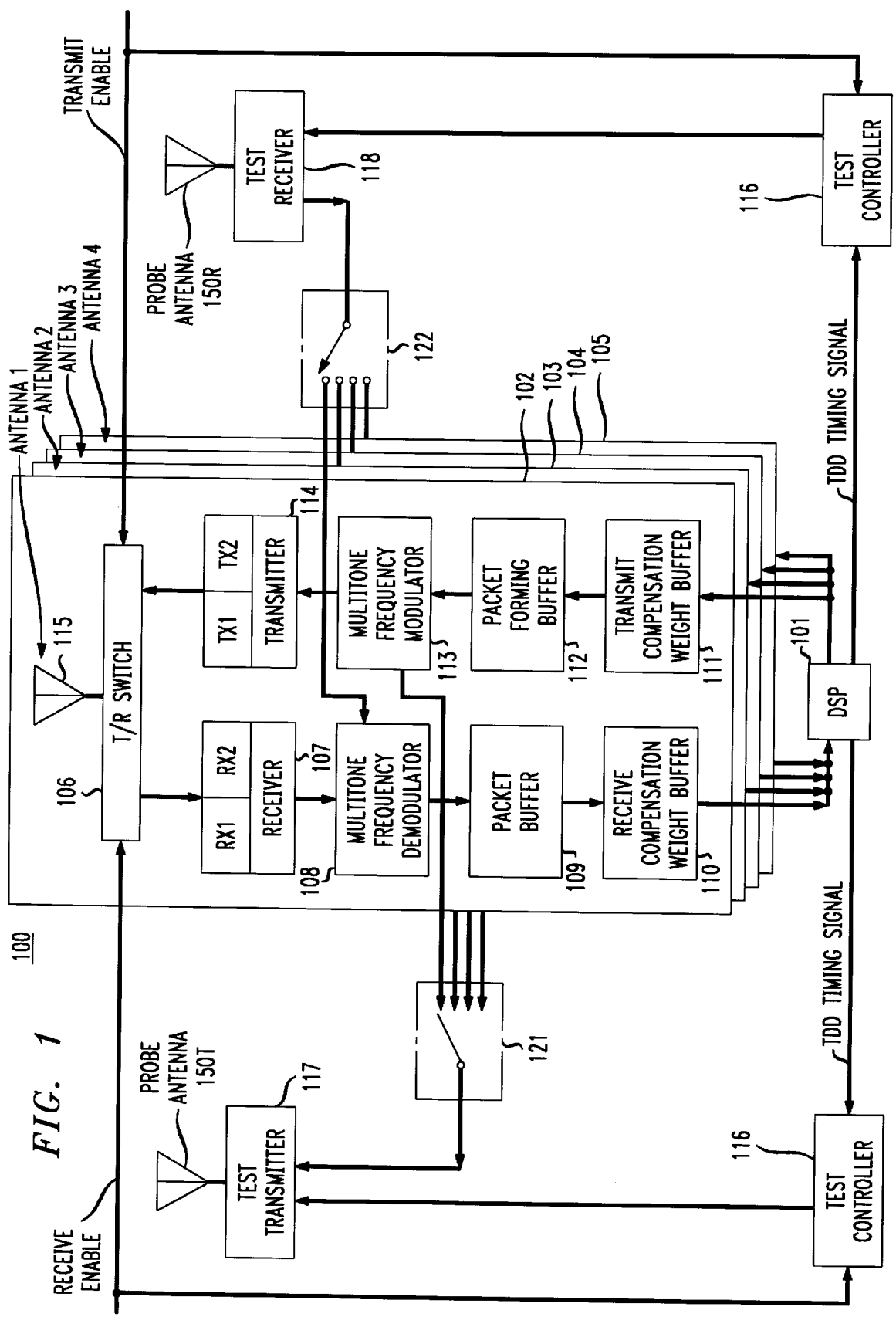
FIG. 1 is a block diagram showing an overview of transmit/receive compensation of a PWAN system.

FIG. 1 is a block diagram showing an overview of a system providing transmit and receive compensation for a base station 100 of a personal wireless access network (PWAN), as is described in the referenced Hoole patent application. Base station 100 has multiple antennas 115 for spatial, as well as spectral, spreading and despreading of discrete multitone spread spectrum (DMT-SS) communications. Each antenna 115 has an associated transmit/receive module having transmission path components and receive path components. Base station 100 also includes a digital signal processor (DSP) 101 connected to each of the four transmit/receive modules 102, 103, 104 and 105. DSP 101 applies spreading and despreading weights for DMT-SS signals for the transmit path and the receive path, respectively, for each antenna 115. Each module 102, 103, 104 and 105 is configured to have the same transmit and receive components, of which only the components for module 102 and the connection to DSP 101 are shown and described. Module 102 includes a transmit path and a receive path that are connected in parallel between DSP 101 and a transmit/receive (T/R) switch 106. T/R switch 106 is connected to an antenna 115. The transmit path includes a transmit compensation weight buffer 111, a packet forming buffer 112, a multitone frequency modulator 113, and a transmitter 114. When module 102 is in a transmit mode, signal flow through the transmit path is from DSP 101 to transmit compensation weight buffer 111, to packet forming buffer 112, to multitone frequency modulator 113, to transmitter 114, and lastly through T/R switch 106 to antenna 115. The receive path includes a receiver 107, a multitone frequency demodulator 108, a packet buffer 109 and a receiver compensation weight buffer 110. When module 102 is in a receive mode, signal flow is from antenna 115 through T/R switch 106 to receiver 107, to multitone frequency demodulator 108, to packet buffer 109, to receive compensation weight buffer 110 and to DSP 101.

The characteristics of the components forming the transmit and receive paths of the respective modules have different values based on component tolerances and that tend to drift over time and in changes in ambient temperature. To compensate for the component tolerances and for drift, the transmission and receive paths for each respective antenna is sequentially tested for measuring the drift of the transmit path components and the receive path components. Compensating weights for each path are generated that are then applied to signals processed in each path. To accomplish this, base station 100 includes a test controller 116 that is connected to DSP 101. Test controller 116 is connected to a test transmitter 117 and a test receiver 118. Test controller 116 is shown in FIG. 1 as two blocks for illustrative convenience. Test transmitter 117 is connected to each module 102, 103, 104 and 105 through a switch 119, so that a receive test signal can be sequentially applied to receiver 107 on each module. Test transmitter 117 receives an output signal from multitone frequency modulator 113 through a switch 121. Test receiver 118 is connected to each module 102, 103, 104 and 105 through a switch 120 so that a transmit signal can be sequentially applied from transmitter 114 to receiver 118 on each transmit/receive module. Test receiver 118 applies an output signal to multitone frequency demodulator 108 through a switch 122.

Figure 2:
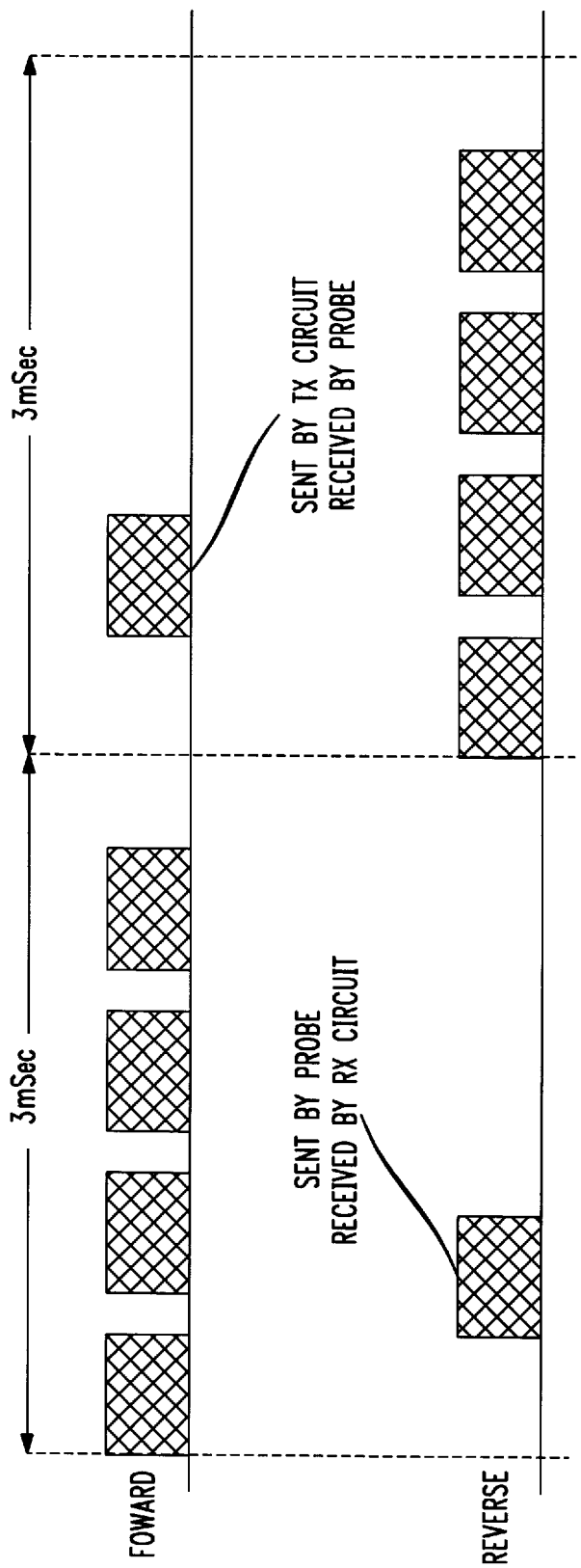
FIG. 2 is a timing diagram for transmit/receive compensation timing for a base station of a PWAN system.

FIG. 2 is a timing diagram for transmit/receive compensation timing for the base station. In a time division duplex (TDD) system, compensation measurements 21 are sequentially made for the receive circuitry of each module during the transmit portion 22 of the TDD cycle 23 and compensation measurements 24 are made for the transmission circuitry during the receive portion 26 of the TDD cycle 23. This approach does not use system bandwidth because when the transmitter portion of a module is active, the receiver portion is being tested and compensated for. Conversely, when the receiver portion of a module is active, the transmitter portion is being tested and compensated for.

In a first TDD interval, test controller 16 uses a TDD timing signal from DSP 101 for first testing the receive path of a first antenna during the base station transmission period. Referring to transmit/receiver module 102, test controller 116 directs a multitone test signal output from frequency modulator 113 in the transmit path and applies it to test transmitter 117. Switch 119 is controlled so that a multitone signal output from test transmitter 117 is applied to the input of receive amplifier 107 in the receive path of module 102. DSP 101 processes the received test signal output by receive amplifier 107 and compiles receive path compensation weights that are stored in receive path compensation buffer 110. The stored receive path compensation weights are then applied to the DMT-SS signals received in all subsequent TDD receive periods until the receive path test for module 102 are repeated.

In the base receive period of the first TDD interval, test controller 116 uses the TDD timing signal from DSP 101 for testing the transmission path of module 102. To test the transmission path, a multitone test signal output from frequency modulator 113 is used for testing the transmit path of module 102. Test controller 116 controls switch 120 so that the resultant signal output from transmitter 114 is directed to the input of test receiver 118. The output of test receiver 118 is then applied to multitone frequency demodulator 108 in the receive path, for a short interval so not to overlap actual DMT-SS signals that are output by receive amplifier 107 during the receive period. DSP 101 processes the received test signal from test receiver 118 and compiles transmit path compensation weights that are stored in transmit path compensation buffer 111. The stored transmit path compensation weights are then applied to DMT-SS signals transmitted in all subsequent TDD receive periods until the transmit path test for module 102 is repeated.

Test controller 116 then moves on to transmit/receive module 103 in the next consecutive (second) TDD interval. Test controller 116 uses the TDD timing signal from DSP 101 for first testing the receive path of module 103 during base station transmission period, and then for testing the transmit path of module 103 during base station receive period. Once module 103 has been tested, test controller 116 moves on to transmit/receive module 104. When module 104 has been tested, test controller tests module 105. When module 105 has been tested, module 102 is retested, and so on.

Figure 3:
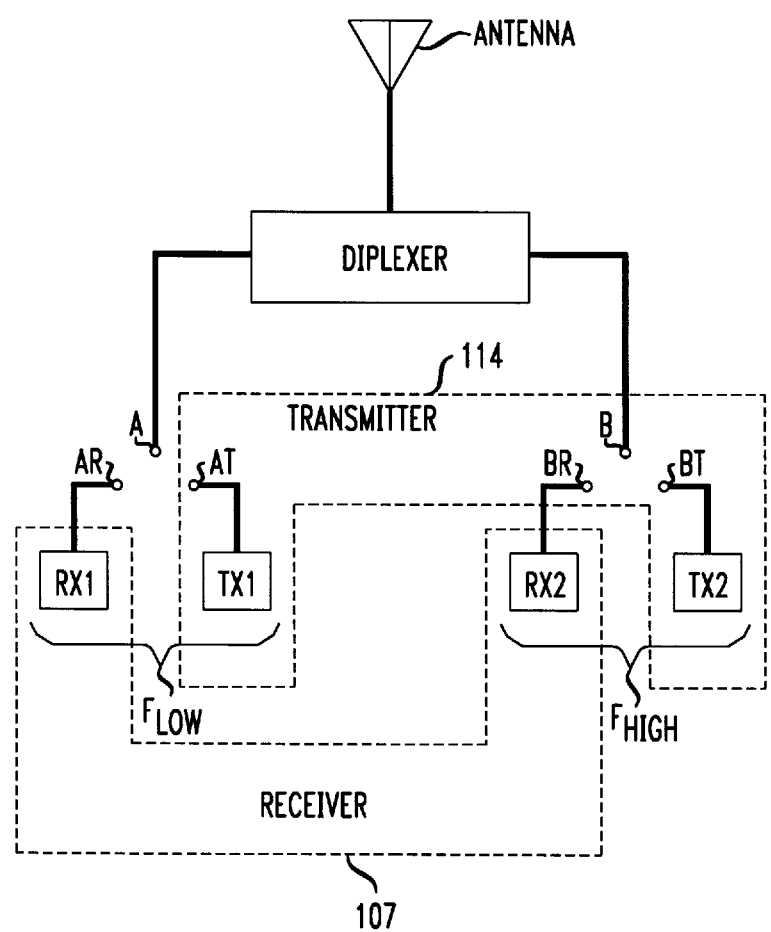
FIG. 3 shows a block diagram of a transmit/receive scheme for a dual FDD/TDD architecture according to the present invention.

The invention includes a dual frequency division duplex (FDD) mode and time division duplex (TDD) mode. FIG. 3 shows a block diagram of the transmit/receive scheme for a dual FDD/TDD architecture according to the present invention. In the FDD mode, the low frequency receiver unit RX1 is set to terminal A of the diplexer and the high frequency transmitter unit TX2 is set to terminal B of the diplexer. In TDD mode two different TDD channels are provided. The first TDD channel uses the low frequency and the switch is reset on every TDD cycle to connect either the transmitter TX1 or the receiver RX1 to the A terminal of the diplexer. The second TDD channel uses the high frequency and the switch is reset on every TDD cycle to connect either the transmitter TX2 or the receiver RX2 to the B terminal of the diplexer. This architecture allows the transmit/receive compensation procedure to be applied to the TDD mode without disabling normal communications. When either TDD channel is in the receive portion of its TDD cycle, then the transmit portion can be tested. Likewise, when either TDD channel is in the transmit portion of its TDD cycle, then the receive portion can be tested.

FIG. 2 is a timing diagram for transmit/receive compensation timing for a base station. In a time division duplex (TDD) system, compensation measurements are made for the transmission circuitry during the receive portion of the TDD cycle and compensation measurements are made for the receive circuitry during the transmit portion of the TDD cycle. A base station has multiple antennas for spatial, as well as spectral, spreading and despreading of discrete multitone spread spectrum (DMT-SS) communications. Each antenna has its own transmission path components and receive path components. The transmit amplifier, for example, in the transmit path and the receive amplifier, for example, in the receive path tend to drift in their characteristics over time. The invention manages the sequential testing of each respective transmission path and receive path for each antenna. The invention measures the drift of the transmit path components and the receive path components and prepares compensating weights to be applied to signals processed in each path.

The base station's digital signal processor (DSP) applies the spreading and despreading weights for the DMT-SS signals for the transmit path and the receive path, respectively, for each antenna. In a first TDD interval, a test controller coupled to the DSP, uses the TDD timing signal from the DSP to first test the receive path of a first antenna (during the base station transmission period). To test the receive path, the test controller takes a multitone test signal output from the frequency modulator in the transmit path and applies it to a test transmitter that directs the multitone signal to the input of the receive amplifier in the receive path. The DSP processes the received test signal output by the receive amplifier and compiles receive path compensation weights that are stored in a receive path compensation buffer. The receive path compensation weights are then applied to the DMT-SS signals received in all later TDD receive periods, until the receive path test for that antenna are repeated.

In the base receive period of the first TDD interval, the test controller coupled to the DSP, uses the TDD timing signal from the DSP to test the transmission path of the first antenna. To test the transmission path, the test controller takes applies a multitone test signal output from the frequency modulator in the transmit path to the transmitter in the transmit path. The test controller then directs the resultant signal output from the transmitter in the transmit path to the input of a test receiver. The output of the test receiver is than applied to the multitone frequency demodulator in the receive path, in a short interval so as to not overlap the DMT-SS signals being output by the receive amplifier during the receive period. The DSP processes the received test signal applied by the test receiver and compiles transmit path compensation weights that are stored in a transmit path compensation buffer. The transmit path compensation weights are then applied to the DMT-SS signals transmitted in all later TDD receive periods, until the transmit path test for that antenna is repeated.

The test controller then moves on to the second antenna in the next consecutive (second) TDD interval. The test controller coupled to the DSP, uses the TDD timing signal from the DSP to first test the receive path of a second antenna (during base station transmission period) and then to test the transmit path of the second antenna (during base station receive period).

Separate physical circuitry exists for transmit and receive. With a TDD system, each one of those circuit paths are being used half the time. If the transmitter is idle half the time and transmit/receive compensation measurements have to be performed on that circuitry then those measurements can be performed during the idle time of the transmitter. This would utilize none of the system band width since at that point in time the receiver would be active. Conversely, when the receiver is idle, the receiver can be compensated. This takes advantage of the duty cycle of the circuitry.

Transmit and receive compensation uses a set of weights that compensates one of the links for the difference in the two paths. The retrodirectivity principle relies on the fact that the transmitter receive paths are identical. The same circuitry used in both directions and the path to the base station electronics are not identical. This is making measurements of the transfer function of the circuitry and producing a set of compensating weights to apply to the transmitted data so that at the antenna the forward and reverse path look identical.

The de-spreading weights at the receiving node (the base station) are with minor modification use as spreading weights on transmission. If the link medium were truly identical, there would be identical weights. The trouble is that either through drift, tolerances in the electronics, and other real life variations the links are not absolutely identical. This compensation will give an additive or more applicable factor that will make the effect of the de-spread weights and the spread weights the same.

In a TDD, in receive mode at the base station and the transmit site is idle, the measurement is performed by sending out a predetermined set of tones out through the transmitter. This is received by a probe antenna and demodulated and investigated. This gives you a measurement of the base station transmitter probe receiver transfer function. The probe antenna is coupled off near the antenna on the base station. From the point where the path between the PA and each antennae have to be phase matched or identical. On measures the base station transmitter probe receiver transfer function and also the base station receiver probe transmitter transfer function. The probe itself has to be measured, the probe transmitter probe receiver transfer function.

The compensation measurements of the receive and transmit circuitry are made during the idle time of the circuitry. The time domain duplexing of the airlink results in a 50% duty cycle for the utilization of the transmit and receive circuits. Therefore compensation measurements can be performed with the circuitry when the airlink dies not require their use.

Use of the T/R duty cycle of the forward and reverse circuits to make T/R compensation measurements frees system bandwidth and provides much greater measurment flexibility.

FIG. 3 shows receiver 107 including the low frequency band receiver RX1 and the high frequency band receiver RX2. FIG. 3 also shows transmitter 114 including the low frequency band transmitter TX1 and the high frequency band transmitter TX2. FIG. 3 shows that in FDD mode, the low frequency receiver unit RX1 is set to terminal A of the diplexer by switch setting AR and the high frequency transmitter unit TX2 is set to terminal B of the diplexer by switch setting BT. In TDD mode two different TDD channels are provided. The first TDD channel uses the low frequency and the switch A is reset on every TDD cycle to connect either the transmitter TX1 (AT setting) or the receiver RX1 (AR setting) to the A terminal of the diplexer. The second TDD channel uses the high frequency and the switch B is reset on every TDD cycle to connect either the transmitter TX2 (BT setting) or the receiver RX2 (BR setting) to the B terminal of the diplexer. This architecture allows the transmit/receive compensation procedure to be applied to the TDD mode without disabling normal communications. When either TDD channel is in the receive portion of its TDD cycle, then the transmit portion can be tested. Likewise, when either TDD channel is in the transmit portion of its TDD cycle, then the receive portion can be tested.

The PWAN system in the PCS spectrum has two radio frequency bands that are separated by 80 MHz from one another. The PWAN system is able to operate in a frequency duplex mode (FDD type system—Frequency Division Duplex) or it can be operated as a time division duplex (TDD).

FIG. 3 shows a block diagram of a transmit/receive scheme for a dual FDD/TDD architecture according to the present invention. In TDD, there is a transmitter and a receiver, a switch at the receiver on both sides and a transmitter on both sides. Each chain has a TRC. In FDD mode, one would pull the switch A to the AR setting to receive and the switch B to the BT setting to transmit and leave them there. The low frequency F(LOW) chain operates as "receive only" and the high frequency chain F(HIGH) operates as "transmit only". This leaves two idle chains all the time. To swap modes so that the receiver is working in the frequency band, switch the TR switches to engage the power amplifier in the one band and the low noise amplifier in the other band. For FDD mode, move the switch and leave it there.

To operate in TDD mode, switch both A and B on every TDD frame. Switch them both (A to AR and B to BR) to receive and receive both frequencies. Then switch them both (A to AT and B to BT) to power and transmit on both frequencies.

The topology is basically an up and down conversion radio. The principle that is that we have two transmit/receive chains, one is dedicated to the lower frequency band and one is dedicated to the higher frequency band, whereas, a typical radio would have an up conversion and a down conversion or a transmit/receive path. Typically, systems are built to do either TDD of FDD. They do not have two complete chains, they only have one. Normally they would dedicate: receive to one frequency band, transmit to the other. Or they would just have one frequency band that they work in. This architecture is built to work in the case where there are diverse frequencies and time division duplex.

In FDD, one has to send for high frequency (the BT setting for B) and receive for low frequency (the AR setting for A). To put this same radio in FDD, the schematic of FIG. 3 looks exactly the same. The only thing different is that one frequency is chosen to receive only. Throw the switch (settings BT for B and AR for A) over and leave it. Choose high frequency to be the transmit. Throw that switch over there and leave it. This gives the opportunity for TR compensation. Power tones can be injected by means of the switches A and B. A power tone can be injected into the system. One would be the injection signal and one would be rating the power. While in the transmit mode (the BT setting) this receive chain is idle(AR setting). In TDD mode, during the transmit portion (the AT and BT settings), the receive is idle (the AR and BR settings). Testing can be done on RX1 and RX2 at this time.

While the present invention has been described in connection with the illustrated embodiments, it will be appreciated and understood that modifications may be made without departing from the true spirit and scope of the invention.

What is claimed is:

1. In a highly bandwidth-efficient communications method, including the steps of:

receiving in a lower frequency receive path and a higher frequency receive path at a base station during a first TDD time period a first spread signal comprising a first data signal spread over a plurality of discrete tones including a lower tone in the lower frequency path and a higher tone in the higher frequency path;

compensating for drift in said lower frequency receive path and mid higher frequency receive path during said first TDD time period by applying receive compensation weights to said first spread signal;

testing a lower frequency transmit path and a higher frequency transmit path at said base station during said first TDD time period and compiling transmit compensation weights;

spreading a second data signal at the base station with a spreading code that distributes the second data signal over a plurality of discrete tones during a second TDD time period;

applying said transmit compensation weights to said second data signal during said second TDD time period;

transmitting said second spread signal over said lower frequency transmit path and said higher frequency transmit path during said second TDD time period; and testing said lower frequency receive path and said higher frequency receive path at said base station during said second TDD time period and compiling new receive compensation weights.

2. In a highly bandwidth-efficient communications system, comprising:

a low frequency receiver for receiving in a lower frequency receive path and a high frequency receiver for receiving in a higher frequency receive path at a base station during a first TDD time period a first spread signal comprising a first data signal spread over a plurality of discrete tones including a lower tone in the lower frequency path and a higher tone in the higher frequency path;

means for compensating for drift in said lower frequency receive path and said higher frequency receive path during said first TDD time period by applying receive compensation weights to said first spread signal;

means for testing a lower frequency transmit path and a higher frequency transmit path at said base station during said first TDD time period and compiling transmit compensation weights;

means for spreading a second data signal at the base station with a spreading code that distributes the second data signal over a plurality of discrete tones during a second TDD time period;

means for applying said transmit compensation weights to said second data signal during said second TDD time period;

a low frequency transmitter for transmitting said second spread signal over said lower frequency transmit path and a high frequency transmitter for transmitting said higher frequency transmit path during said second TDD time period; and means for testing said lower frequency receive path and said higher frequency receive path at said base station during said second time period and compiling new receive compensation weights.

* * * * *